(12) United States Patent
Saini et al.

(10) Patent No.: US 10,066,443 B2
(45) Date of Patent: Sep. 4, 2018

(54) CHEMICALLY STRENGTHENED BOND BETWEEN THERMALLY STABLE POLYCRYSTALLINE HARD MATERIALS AND BRAZE MATERIAL

(71) Applicant: Halliburton Energy Services, Inc., Houston, TX (US)

(72) Inventors: Gagan Saini, Conroe, TX (US); Qi Liang, Richmond, VA (US)

(73) Assignee: Haliburton Energy Services, Inc., Houston, TX (US)

( * ) Notice: Subject to any disclaimer, the term of this patent is extended or adjusted under 35 U.S.C. 154(b) by 243 days.

(21) Appl. No.: 14/890,820

(22) PCT Filed: Dec. 22, 2014

(86) PCT No.: PCT/US2014/071868
§ 371 (c)(1),
(2) Date: Nov. 12, 2015

(87) PCT Pub. No.: WO2016/105340
PCT Pub. Date: Jun. 30, 2016

(65) Prior Publication Data
US 2016/0348446 A1 Dec. 1, 2016

(51) Int. Cl.
*E21B 10/46* (2006.01)
*E21B 10/55* (2006.01)
(Continued)

(52) U.S. Cl.
CPC ........ *E21B 10/5735* (2013.01); *B23K 1/0008* (2013.01); *B23K 1/19* (2013.01);
(Continued)

(58) Field of Classification Search
CPC .... E21B 10/46; E21B 2010/545; E21B 10/55; E21B 2010/561; E21B 10/567
See application file for complete search history.

(56) References Cited

U.S. PATENT DOCUMENTS 4,188,194 A * 2/1980 Corrigan ................ B01J 3/062
257/E23.009
5,366,522 A 11/1994 Nakamura et al.
(Continued)

FOREIGN PATENT DOCUMENTS

WO 1999029465 A1 6/1999
WO 2014011855 A1 1/2014

OTHER PUBLICATIONS

International Search Report and Written Opinion for PCT/US2014/071868 dated Aug. 26, 2015.
(Continued)

*Primary Examiner* — Cathleen R Hutchins
(74) *Attorney, Agent, or Firm* — McDermott Will & Emery LLP

(57) ABSTRACT

Chemical methods, optionally in combination with physical methods, may be used to increase the strength of the bond formed by a braze material between a polycrystalline material and a hard composite. Such polycrystalline materials brazed to hard composites may be found in various wellbore tools include drill bit cutters. An exemplary method may include forming a bonding layer on a bonding surface of a polycrystalline material body that comprises a hard material, the bonding surface opposing a contact surface of the polycrystalline material body, and the bonding layer substantially formed by a [111] crystal structure of the hard material, a [100] crystal structure of the hard material, or a combination thereof; and brazing the bonding layer to a hard composite using a braze material.

15 Claims, 5 Drawing Sheets

(51) Int. Cl.

| | |
|---|---|
| *E21B 10/567* | (2006.01) |
| *E21B 10/573* | (2006.01) |
| *B23K 1/00* | (2006.01) |
| *B23K 1/19* | (2006.01) |
| *B23K 35/30* | (2006.01) |
| *C04B 37/00* | (2006.01) |
| *B23K 103/00* | (2006.01) |
| *B23K 101/00* | (2006.01) |

(52) U.S. Cl.
CPC .......... *B23K 35/302* (2013.01); *C04B 37/001* (2013.01); *E21B 10/55* (2013.01); *E21B 10/567* (2013.01); *B23K 2201/002* (2013.01); *B23K 2203/52* (2015.10); *C04B 2237/361* (2013.01); *C04B 2237/363* (2013.01); *C04B 2237/365* (2013.01)

(56) References Cited

U.S. PATENT DOCUMENTS

| | | | |
|---|---|---|---|
| 5,435,815 A | 7/1995 | Ikegaya et al. | |
| 5,458,733 A * | 10/1995 | Tessmer | C23C 16/02 216/67 |
| 5,479,875 A | 1/1996 | Tachibana et al. | |
| 5,483,084 A | 1/1996 | Hirabayashi | |
| 5,523,158 A | 6/1996 | Kapoor et al. | |
| 5,647,878 A | 7/1997 | Iacovangelo et al. | |
| 5,851,658 A | 12/1998 | Yamamoto et al. | |
| 5,882,786 A | 3/1999 | Nassau et al. | |
| H1792 H | 4/1999 | Moran et al. | |
| 6,344,149 B1 | 2/2002 | Oles | |
| 6,450,271 B1 | 9/2002 | Tibbitts et al. | |
| 6,659,161 B1 | 12/2003 | Sung | |
| 7,124,753 B2 | 10/2006 | Sung | |
| 7,367,875 B2 | 5/2008 | Slut et al. | |
| 7,390,695 B2 | 6/2008 | Meguro et al. | |
| 7,909,121 B2 | 3/2011 | Voronin et al. | |
| 8,020,643 B2 | 9/2011 | Russell et al. | |
| 8,336,648 B1 | 12/2012 | Weaver et al. | |
| 8,763,730 B2 | 7/2014 | Cariveau et al. | |
| 2004/0118613 A1* | 6/2004 | Vail, III | E21B 7/065 175/65 |
| 2008/0230279 A1 | 9/2008 | Bitler et al. | |
| 2010/0243336 A1 | 9/2010 | Dourfaye et al. | |
| 2010/0300767 A1 | 12/2010 | Cariveau et al. | |
| 2013/0022836 A1 | 1/2013 | Easley et al. | |
| 2013/0272928 A1 | 10/2013 | Misra | |
| 2013/0299249 A1 | 11/2013 | Weaver et al. | |

OTHER PUBLICATIONS

Palavra et al., Wettability Studies of Reactive Brazing Alloys on CVD Diamond Plates, Elsevier, 2001.
Balmer et al., Chemical Vapour Deposition Synthetic Diamond: Materials, Technolgy and Applications, 2009.
Ashfold et al., Thin Film-Diamond by Chemical Vapour Deposition Methods, 1994.
Regel et al., Diamond Film Deposition by Chemical Vapor Transport, 2001.
kinik.com.tw, OEM Coating Service of CVD Diamond Film on Milling Cutter/Drill/Router, 2014.
Tanaka et al., Affinity of Diamond for Metals, Annals of the CIRP, vol. 30/1/1981.
Dorsch et al., Etching of Polycrystalline Diamond and Amorphous Carbon Films by RIE, Diamond and Related Materials, 1 (1992) 277-280, Elsevier Science Publishers B.V., Amsterdam.
Shiomi, Hiromu, Reactive Ion Etching of Diamond in O2 and CF4 Plasma, and Fabrication of Porous Diamond for Field Emitter Cathodes, 1997.

* cited by examiner

CHEMICALLY STRENGTHENED BOND BETWEEN THERMALLY STABLE POLYCRYSTALLINE HARD MATERIALS AND BRAZE MATERIAL

BACKGROUND

The present application relates to bonding hard composites to polycrystalline materials, including but not limited to, polycrystalline diamond ("PCD") materials and thermally stable polycrystalline ("TSP") materials.

Drill bits and components thereof are often subjected to extreme conditions (e.g., high temperatures, high pressures, and contact with abrasive surfaces) during subterranean formation drilling or mining operations. Hard materials like diamond, cubic boron nitride, and silicon carbide are often used at the contact points between the drill bit and the formation because of their wear resistance, hardness, and ability to conduct heat away from the point of contact with the formation.

Generally, such hard materials are formed by combining particles of the hard material and a catalyst, such that when heated the catalyst facilitates growth and/or binding of the hard material so as to bind the particles together to form a polycrystalline material. However, the catalyst remains within the body of the polycrystalline material after forming. Because the catalyst generally has a higher coefficient of thermal expansion than the hard material, the catalyst can cause fractures throughout the polycrystalline material when the polycrystalline material is heated (e.g., during brazing to attach the polycrystalline material to the drill bit or a portion thereof like a cutter or during operation downhole). These fractures weaken the polycrystalline material and may lead to a reduced lifetime for the drill bit.

To mitigate fracturing of the polycrystalline material, it is common to remove at least some of the catalyst, and preferably most of the catalyst, before exposing the polycrystalline material to elevated temperatures. Polycrystalline materials that have a substantial amount of the catalyst removed are referred to as thermally stable polycrystalline ("TSP") materials.

Specifically for drill bits, TSP materials are often bonded to another material (e.g., a hard composite like tungsten carbide particles dispersed in a copper binder) to allow the more expensive TSP materials to be strategically located at desired contact points with the formation. However, separation of the TSP material and the surface to which it is bonded during operation reduces the efficacy and lifetime of the drill bit.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to bonding polycrystalline materials to hard composites when forming abrasive components of downhole tools (e.g., cutters for use in drill bits). More specifically, the present application relates to chemical methods, optionally in combination with physical methods, for increasing the strength of the bond formed by a braze material between the polycrystalline materials and the hard composite. The teachings of this disclosure can be applied to any downhole tool or component thereof where polycrystalline materials are brazed to a hard composite. Such tools may include tools for drilling wells, completing wells, and producing hydrocarbons from wells. Examples of such tools include cutting tools, such as drill bits, reamers, stabilizers, and coring bits; drilling tools, such as rotary steerable devices and mud motors; and other tools used downhole, such as window mills, packers, tool joints, and other wear-prone tools.

Figure 1:
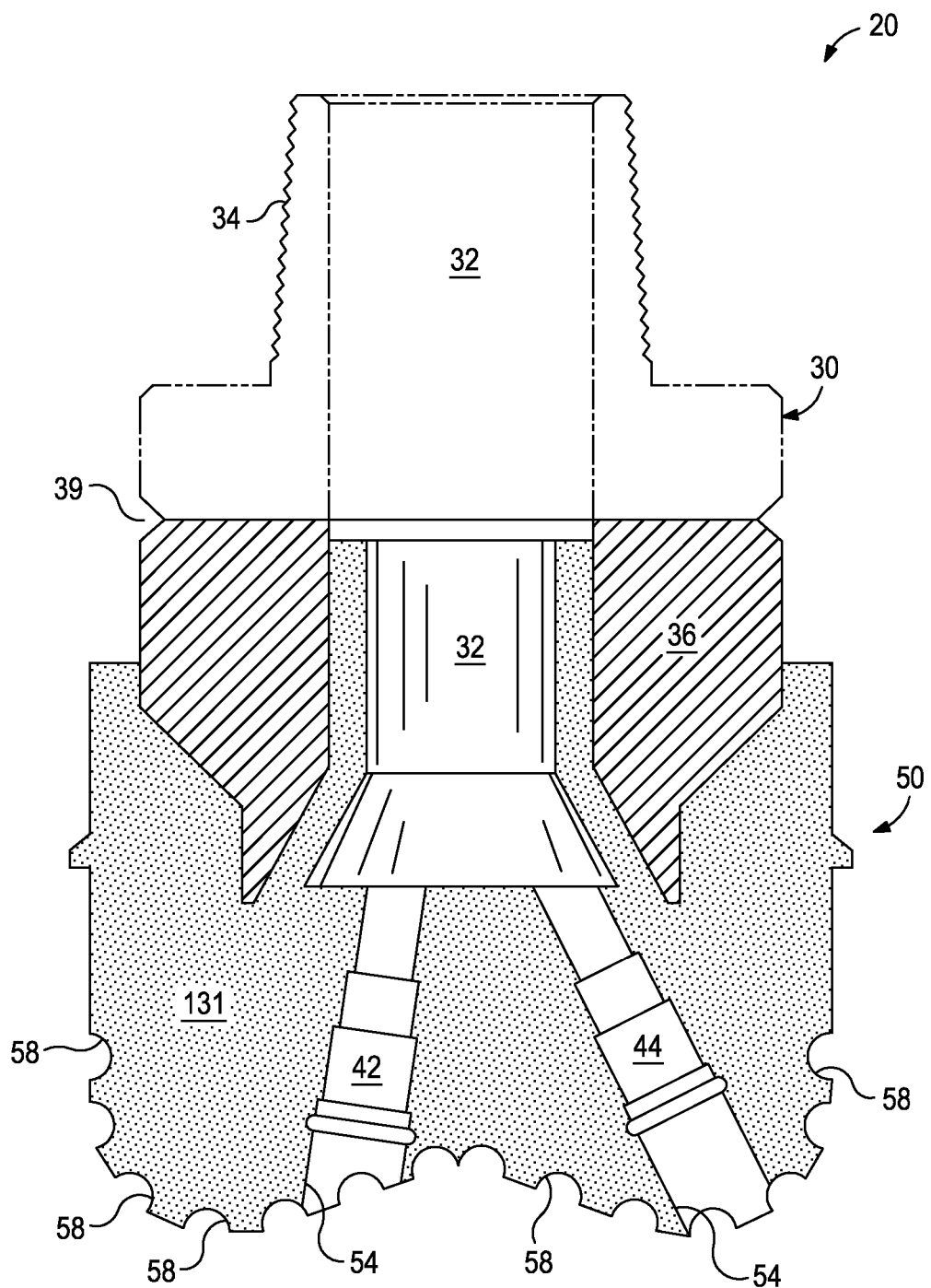
FIG. 1 is a cross-sectional view of a matrix drill bit having a matrix bit body formed by a hard composite material.

FIG. 1 is a cross-sectional view of a matrix drill bit 20 having a matrix bit body 50 formed by a hard composite material 131. An exemplary hard composite material may include, but not be limited to, reinforcing particles dispersed in a binder material. As used herein, the term "matrix drill bit" encompasses rotary drag bits, drag bits, fixed cutter drill bits, and any other drill bit having a matrix bit body and capable of incorporating the teachings of the present disclosure.

For embodiments such as those shown in FIG. 1, the matrix drill bit 20 may include a metal shank 30 with a metal blank 36 securely attached thereto (e.g., at weld location 39). The metal blank 36 extends into matrix bit body 50. The metal shank 30 includes a threaded connection 34 distal to the metal blank 36.

The metal shank 30 and metal blank 36 are generally cylindrical structures that at least partially define corresponding fluid cavities 32 that fluidly communicate with each other. The fluid cavity 32 of the metal blank 36 may further extend longitudinally into the matrix bit body 50. At least one flow passageway (shown as two flow passageways 42 and 44) may extend from the fluid cavity 32 to exterior portions of the matrix bit body 50. Nozzle openings 54 may be defined at the ends of the flow passageways 42 and 44 at the exterior portions of the matrix bit body 50.

A plurality of indentations or pockets 58 are formed in the matrix bit body 50 and are shaped or otherwise configured to receive cutters.

Figure 2:
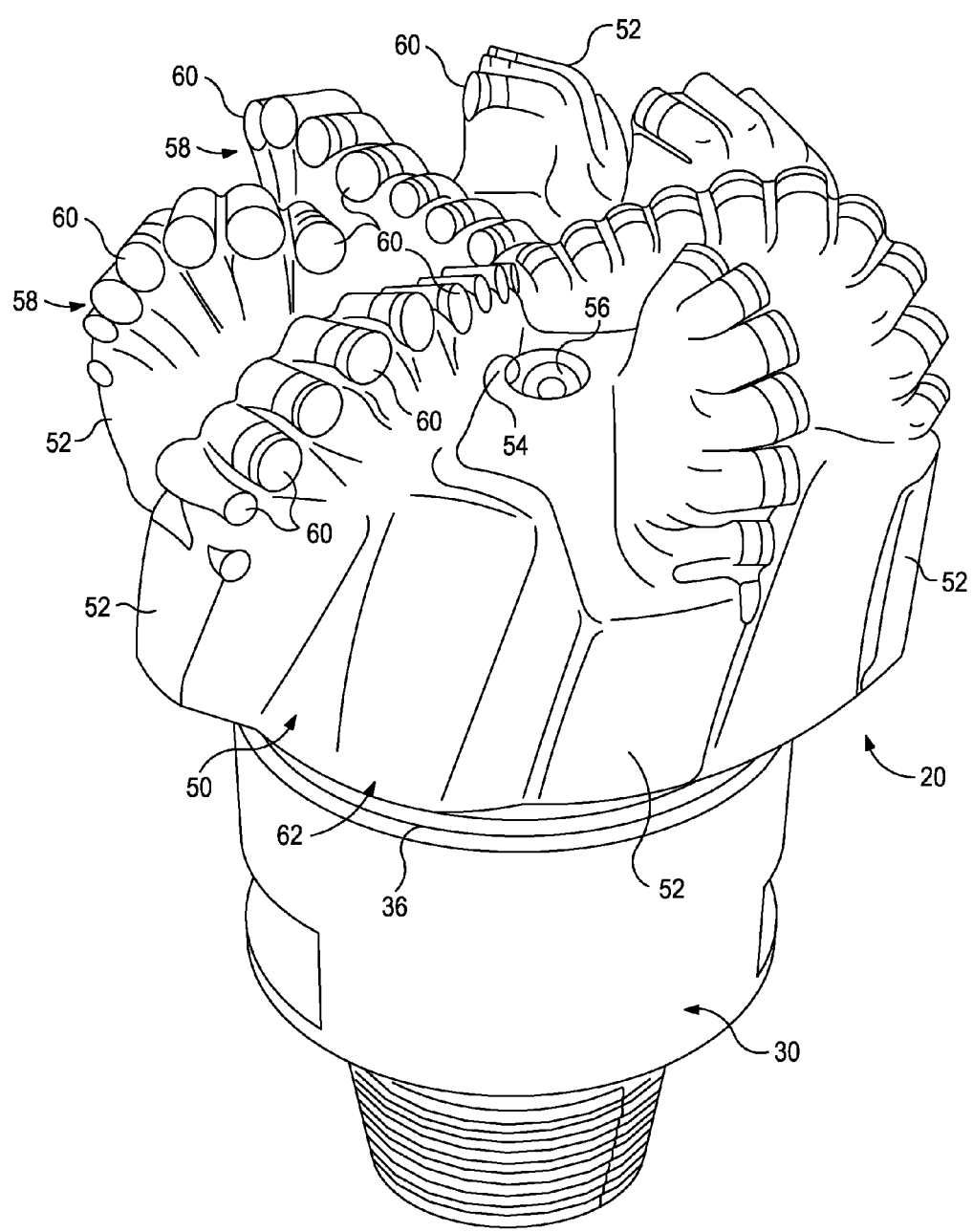
FIG. 2 is an isometric view of the matrix drill bit that includes polycrystalline material cutters according to at least some embodiments of the present disclosure.

FIG. 2 is an isometric view of the matrix drill bit that includes a plurality of cutters 60 according to at least some embodiments of the present disclosure. As illustrated, the matrix drill bit 20 includes the metal blank 36 and the metal shank 30, as generally described above with reference to FIG. 1.

The matrix bit body 50 includes a plurality of cutter blades 52 formed on the exterior of the matrix bit body 50. Cutter blades 52 may be spaced from each other on the exterior of the matrix bit body 50 to form fluid flow paths or junk slots 62 therebetween.

As illustrated, the plurality of pockets 58 may be formed in the cutter blades 52 at selected locations. A cutter 60 may be securely mounted (e.g., via brazing) in each pocket 58 to engage and remove portions of a subterranean formation during drilling operations. More particularly, each cutter 60 may scrape and gouge formation materials from the bottom and sides of a wellbore during rotation of the matrix drill bit 20 by an attached drill string.

A nozzle 56 may be disposed in each nozzle opening 54. For some applications, nozzles 56 may be described or otherwise characterized as "interchangeable" nozzles.

Figure 3A:
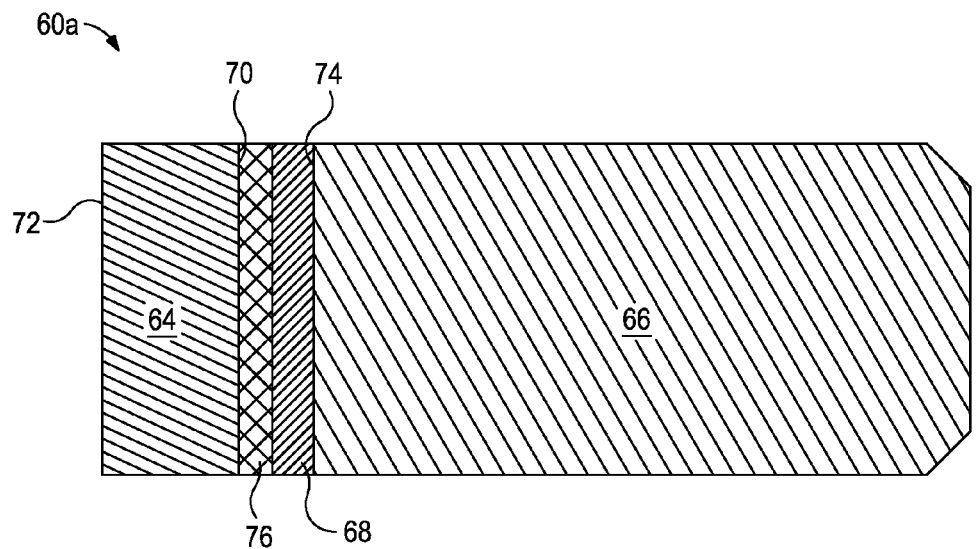
FIGS. 3A and 3B are cross-sectional views of polycrystalline material cutters according to at least some embodiments of the present disclosure.
Figure 3B:
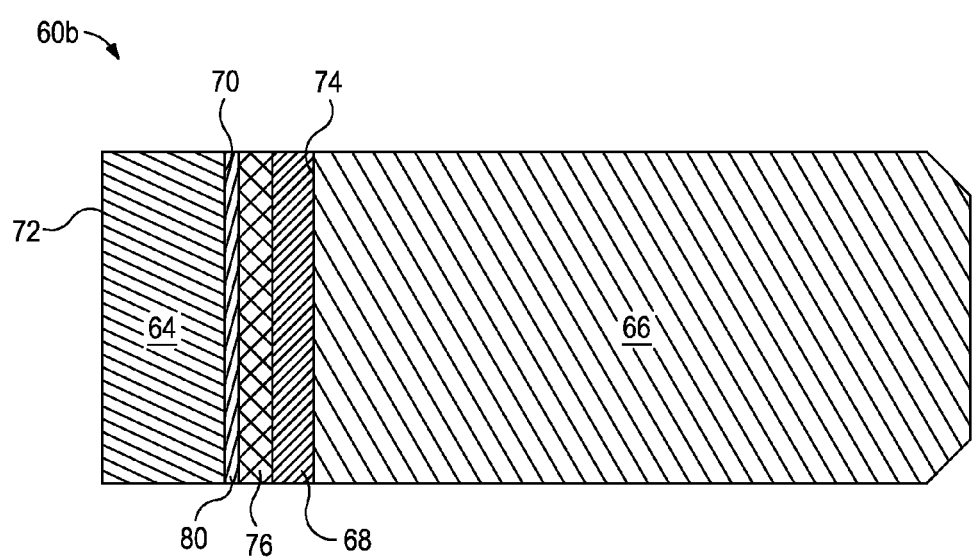

FIGS. 3A and 3B are cross-sectional views of exemplary cutters 60a and 60b, respectively, according to at least some embodiments of the present disclosure. The cutter 60 is formed by a polycrystalline material body 64 having a bonding layer 76 bonded to a hard composite body 66 with braze 68. The bonding layer 76 may be substantially formed by [111] crystal structures, [100] crystal structures, or both of the corresponding hard material. That is, at least 50% of the bonding layer 76 may have or otherwise exhibit a [111] crystal structure, a [100] crystal structure, or a combination thereof. Without being limited by theory, it is believed that [111] crystal faces and [100] crystal faces may have greater bonding strength to braze materials (e.g., alloys of at least two of silver, copper, nickel, titanium, vanadium, phosphorous, silicon, aluminum, molybdenum and the like), which may prove useful in mitigating separation of the polycrystalline material body 64 and the hard composite body 66 during use downhole.

By way of nonlimiting example, the bonding layer 76 may be substantially formed by a [111] crystal structure, and the braze may be a copper-silicon alloy with titanium as the active element. By way of another nonlimiting example, the bonding layer 76 may be substantially formed by a [100] crystal structure, and the braze may be a copper-silicon eutectic alloy with titanium as the active element.

Examples of polycrystalline materials suitable for use as the polycrystalline material body 64 may include, but are not limited to, polycrystalline diamond, polycrystalline cubic boron nitride, polycrystalline silicon carbide, TSP diamond, TSP cubic boron nitride, TSP silicon carbide, and the like. As described in more detail above, a polycrystalline material is formed by subjecting small grains of a hard material (e.g., diamond, cubic boron nitride, and silicon carbide) that are randomly oriented and other starting materials (e.g., catalyst) to ultrahigh pressure and temperature conditions. Then, the TSP material may be formed by removing at least a portion of the catalyst from the structure.

The resultant polycrystalline material body 64 may define and otherwise provide a bonding surface 70 opposite a cutting surface 72. Because of the forming or synthesis method, the surfaces 70,72 have no preferential crystal structure. As illustrated in FIG. 3A, the bonding layer 76 may be formed on the bonding surface 70 of the polycrystalline material body 64, additional details provided herein. Alternatively, in FIG. 3B, a refractory nitride layer 80 may be deposited on the bonding surface 70 of the polycrystalline material body 64. Then, the bonding layer 76 may be formed on the refractory nitride layer 80. The refractory nitride layer 80 may facilitate forming or synthesizing the preferred diamond crystal structure of the bonding layer 76.

The hard composite body 66 may define and otherwise provide a bonding surface 74. The bonding layer 76 and the bonding surface 74 of the hard composite body 66 may be coupled and otherwise bonded together with the braze 68. Further, once the polycrystalline material body 64 and the hard composite body 66 are bonded, the cutting surface 72 of the polycrystalline material body 64 is appropriately located such that once the cutter 60 is assembled in a drill bit the cutting surface 72 is positioned to engage the formation during use of the drill bit.

In some embodiments, the bonding layer 76 may be formed by chemical vapor deposition where temperature, gas composition, and pressure may be used to preferentially form [111] crystal structures, [100] crystal structures, or a combination thereof. For example, diamond [111] crystal structures and diamond [100] crystal structures may be formed by reacting hydrogen, oxygen, and a carbon-containing gas (e.g., methane) in a hydrogen plasma where the bonding surface 70 or the refractory nitride layer 80 temperature is at 600° C. to 1100° C. The relative concentrations of hydrogen, oxygen, and the carbon-containing gas may be 200 parts to 250 parts hydrogen, 0.5 parts to 3 parts oxygen, and 3 parts to 8 parts carbon-containing gas. In some embodiments, preferentially forming [111] crystal structures may be achieved by maintaining a total pressure 30 torr or greater. In some embodiments, preferentially forming [100] crystal structures may be achieved by maintaining a total pressure less than 30 torr. Generally, when forming the bonding layer 76, the bonding surface 70 or the refractory nitride layer 80 may be heated to the desired temperature, the gas pressure with hydrogen only may be achieved, and the plasma may be initiated (e.g., using microwave power). Then, flow of the carbon-containing gas may begin followed by the oxygen. Once all gases are flowing (where relative flow rates may be used to achieve desired gas concentrations in the reactor), the reaction may be allowed to proceed for a desired amount of time (e.g., 1 hour to 24 hours) depending on the desired thickness of the bonding layer 76.

In some instances, the bonding layer 76 may have a thickness of 10 microns to 250 microns, including subsets therebetween (e.g., 50 microns to 200 microns, 100 microns to 250 microns, or 100 microns to 150 microns).

Figure 4A:
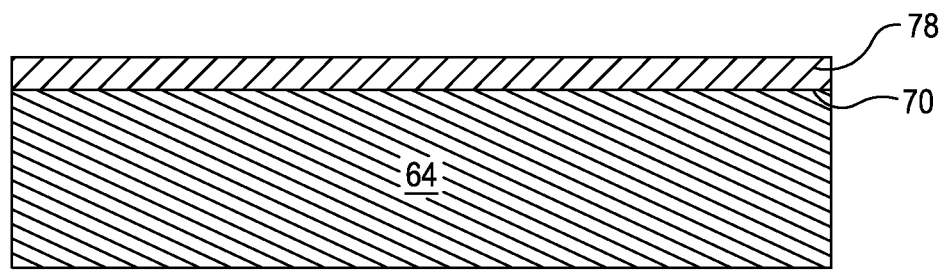
FIGS. 4A and 4B illustrate a side-view and a top view of a mask disposed on the bonding surface of a polycrystalline material body.
Figure 4B:
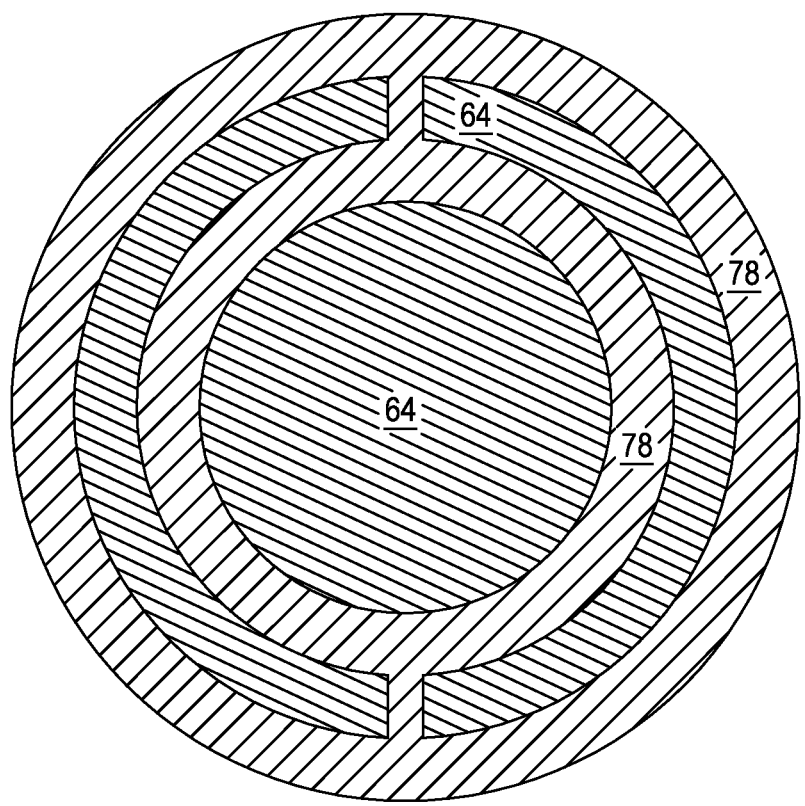

In some embodiments when forming the bonding layer 76 or the refractory nitride layer 80, a mask may be used to so that the bonding layer 76 or the refractory nitride layer 80 is formed only on a portion thereof. FIGS. 4A and 4B illustrate a side-view and a top view, respectively, of a mask 78 disposed on the bonding surface 70 of a polycrystalline material body 64, which alternatively could be the refractory nitride layer 80 deposited on the polycrystalline material body 64. As best seen in FIG. 4B, the mask 78 covers only a portion of the bonding surface 70 such that the bonding layer 76 may form on only the exposed portions of the bonding surface 70. Such masking may be beneficial for producing reliefs (i.e., protrusions), which results in an uneven bonding layer 76. The uneven bonding layer 76 may provide additional surface area that may be contacted with the braze material 68, and thereby potentially enhance the strength of the braze bond.

Masks may be formed by any known methods (e.g., photomasking) with materials suitable for withstanding further processing ensuring the formation of the bonding layer 76. Examples of materials suitable for use as a mask may include, but are not limited to, silicon oxide, metallic films, photoresist materials, and the like.

Masks may be used to form any pattern, for example, squares, concentric circles, stripes, and the like.

Examples of hard composites used to form the hard composite body 66 described herein may be formed by reinforcing particles dispersed in a binder material. Exemplary binder materials may include, but are not limited to, copper, nickel, cobalt, iron, aluminum, molybdenum, chromium, manganese, tin, zinc, lead, silicon, tungsten, boron, phosphorous, gold, silver, palladium, indium, any mixture thereof, any alloy thereof, and any combination thereof. Nonlimiting examples of binder materials may include copper-phosphorus, copper-phosphorous-silver, copper-manganese-phosphorous, copper-nickel, copper-manganese-nickel, copper-manganese-zinc, copper-manganese-nickel-zinc, copper-nickel-indium, copper-tin-manganese-nickel, copper-tin-manganese-nickel-iron, gold-nickel, gold-palladium-nickel, gold-copper-nickel, silver-copper-zinc-nickel, silver-manganese, silver-copper-zinc-cadmium, silver-copper-tin, cobalt-silicon-chromium-nickel-tungsten, cobalt-silicon-chromium-nickel-tungsten-boron, manganese-nickel-cobalt-boron, nickel-silicon-chromium, nickel-chromium-silicon-manganese, nickel-chromium-silicon, nickel-silicon-boron, nickel-silicon-chromium-boron-iron, nickel-phosphorus, nickel-manganese, copper-aluminum, copper-aluminum-nickel, copper-aluminum-nickel-iron, copper-aluminum-nickel-zinc-tin-iron, and the like, and any combination thereof. Exemplary reinforcing particles may include, but are not limited to, particles of metals, metal alloys, metal carbides, metal nitrides, diamonds, superalloys, and the like, or any combination thereof. Examples of reinforcing particles suitable for use in conjunction with the embodiments described herein may include particles that include, but not be limited to, nitrides, silicon nitrides, boron nitrides, cubic boron nitrides, natural diamonds, synthetic diamonds, cemented carbide, spherical carbides, low alloy sintered materials, cast carbides, silicon carbides, boron carbides, cubic boron carbides, molybdenum carbides, titanium carbides, tantalum carbides, niobium carbides, chromium carbides, vanadium carbides, iron carbides, tungsten carbides, macrocrystalline tungsten carbides, cast tungsten carbides, crushed sintered tungsten carbides, carburized tungsten carbides, steels, stainless steels, austenitic steels, ferritic steels, martensitic steels, precipitation-hardening steels, duplex stainless steels, ceramics, iron alloys, nickel alloys, chromium alloys, HASTELLOY® alloys (nickel-chromium containing alloys, available from Haynes International), INCONEL® alloys (austenitic nickel-chromium containing superalloys, available from Special Metals Corporation), WASPALOYS® (austenitic nickel-based superalloys, available from United Technologies Corp.), RENE® alloys (nickel-chrome containing alloys, available from Altemp Alloys, Inc.), HAYNES® alloys (nickel-chromium containing superalloys, available from Haynes International), INCOLOY® alloys (iron-nickel containing superalloys, available from Mega Mex), MP98T (a nickel-copper-chromium superalloy, available from SPS Technologies), TMS alloys, CMSX® alloys (nickel-based superalloys, available from C-M Group), N-155 alloys, any mixture thereof, and any combination thereof.

Figure 5:
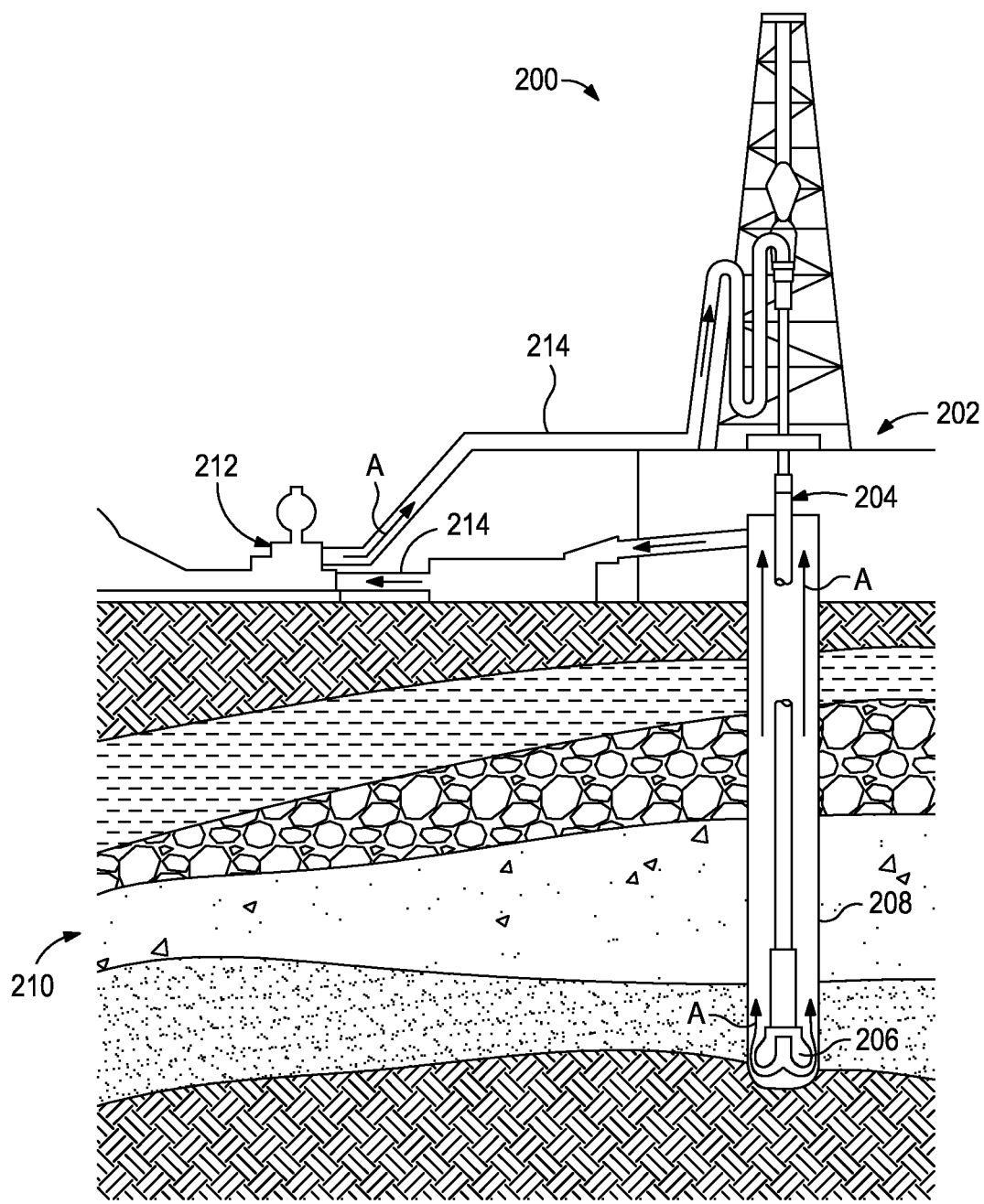
FIG. 5 is a schematic drawing showing one example of a drilling assembly suitable for use in conjunction with the matrix drill bits that include polycrystalline material cutters of the present disclosure.

FIG. 5 is a schematic showing one example of a drilling assembly 200 suitable for use in conjunction with matrix drill bits that include the cutters of the present disclosure (e.g., cutter 60 of FIGS. 2-3). It should be noted that while FIG. 5 generally depicts a land-based drilling assembly, those skilled in the art will readily recognize that the principles described herein are equally applicable to subsea drilling operations that employ floating or sea-based platforms and rigs, without departing from the scope of the disclosure.

The drilling assembly 200 includes a drilling platform 202 coupled to a drill string 204. The drill string 204 may include, but is not limited to, drill pipe and coiled tubing, as generally known to those skilled in the art apart from the particular teachings of this disclosure. A matrix drill bit 206 according to the embodiments described herein is attached to the distal end of the drill string 204 and is driven either by a downhole motor and/or via rotation of the drill string 204 from the well surface. As the drill bit 206 rotates, it creates a wellbore 208 that penetrates the subterranean formation 210. The drilling assembly 200 also includes a pump 212 that circulates a drilling fluid through the drill string (as illustrated as flow arrows A) and other pipes 214.

One skilled in the art would recognize the other equipment suitable for use in conjunction with drilling assembly 200, which may include, but is not limited to, retention pits, mixers, shakers (e.g., shale shaker), centrifuges, hydrocyclones, separators (including magnetic and electrical separators), desilters, desanders, filters (e.g., diatomaceous earth filters), heat exchangers, and any fluid reclamation equipment. Further, the drilling assembly may include one or more sensors, gauges, pumps, compressors, and the like.

Embodiments disclosed herein include:

A. a method that includes forming a bonding layer on a bonding surface of a polycrystalline material body that comprises a hard material, the bonding surface opposing a contact surface of the polycrystalline material body, and the bonding layer substantially formed by a [111] crystal structure of the hard material, a [100] crystal structure of the hard material, or a combination thereof; and brazing the bonding layer to a hard composite using a braze material;

B. a method that includes depositing a refractory nitride layer on a bonding surface of a polycrystalline material body that comprises a hard material, the bonding surface opposing a contact surface of the polycrystalline material body; forming a bonding layer on the refractory nitride layer, the bonding layer substantially formed by a [111] crystal structure of the hard material, a [100] crystal structure of the hard material, or a combination thereof; and brazing the bonding layer to a hard composite using a braze material; and C. a cutter that includes a polycrystalline material body having a bonding surface opposing a contact surface; a bonding layer disposed on the bonding surface, the bonding layer substantially formed by a [111] crystal structure, a [100] crystal structure, or a combination thereof; and a hard composite bound to the bonding layer opposite the polycrystalline material body with a braze material;

D. a cutter that includes a polycrystalline material body having a bonding surface opposing a contact surface; a refractory nitride layer disposed on the bonding surface of the polycrystalline material body; a bonding layer disposed on the refractory nitride layer, the bonding layer substantially formed by a [111] crystal structure, a [100] crystal structure, or a combination thereof; and a hard composite bound to the bonding layer opposite the polycrystalline material body with a braze material; and E. a drilling assembly that includes a drill string extendable from a drilling platform and into a wellbore; a pump fluidly connected to the drill string and configured to circulate a drilling fluid into the drill string and through the wellbore; and a drill bit attached to an end of the drill string, the drill bit having a matrix bit body and a plurality of cutting cutters according to Embodiments C, D, or both coupled to an exterior portion of the matrix bit body.

Each of embodiments A and B may have one or more of the following additional elements in any combination: Element 1: the method further including forming the bonding layer to have a thickness of 10 microns to 250 microns at the bonding surface; Element 2: the method further including masking the bonding surface of the polycrystalline material body or the refractory nitride layer before forming the bonding layer; and removing the mask after forming the bonding layer and before brazing the bonding layer to the hard composite; Element 3: wherein the hard material is diamond, the bonding layer is substantially formed by the [111] crystal structure of the diamond, and forming the bonding layer involves: treating the bonding surface or the refractory nitride layer with a hydrogen plasma in the presence of oxygen and a carbon-containing gas at 600° C. to 1100° C. at a total pressure 30 torr or greater and a gas composition of 200 parts to 250 parts hydrogen, 0.5 parts to 3 parts oxygen, and 3 parts to 8 parts carbon-containing gas; Element 4: wherein the hard material is diamond, the bonding layer is substantially formed by the [100] crystal structure of the diamond, and forming the bonding layer involves: treating the bonding surface or the refractory nitride layer with a hydrogen plasma in the presence of oxygen and a carbon-containing gas at 600° C. to 1100° C. at a total pressure less than 30 torr and a gas composition of 200 parts to 250 parts hydrogen, 0.5 parts to 3 parts oxygen, and 3 parts to 8 parts carbon-containing gas; Element 5: wherein the hard material is cubic boron nitride; and Element 6: wherein the hard material is silicon carbide.

By way of non-limiting example, exemplary combinations applicable to A and B: Element 1 in combination with Element 2 and optionally one of Elements 3-6; Element 1 in combination with one of Elements 3-6; and Element 2 in combination with one of Elements 3-6.

Each of embodiments C, D, and E may have one or more of the following additional elements in any combination: Element 7: wherein the bonding layer has a thickness of 10 microns to 250 microns at the bonding surface; Element 8: wherein the hard material is diamond; Element 9: wherein the hard material is cubic boron nitride; and Element 10: wherein the hard material is silicon carbide.

By way of non-limiting example, exemplary combinations applicable to A and B: Element 7 in combination with one of Elements 8-10.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces.

The invention claimed is:

1. A method of making a drill bit cutter, comprising:
forming, by chemical vapor deposition, a bonding layer on a bonding surface of a polycrystalline material body that comprises a hard material, the bonding surface opposing a contact surface of the polycrystalline material body, and the bonding layer substantially formed by the chemical vapor deposition to have a [111] crystal structure of the hard material, a [100] crystal structure of the hard material, or a combination thereof; and
brazing the bonding layer to a hard composite using a braze material to make the drill bit cutter.

2. The method of claim 1 further comprising:
forming the bonding layer to have a thickness of 10 microns to 250 microns at the bonding surface.

3. The method of claim 1 further comprising:
masking the bonding surface of the polycrystalline material body before forming the bonding layer; and
removing the mask after forming the bonding layer and before brazing the bonding layer to the hard composite.

4. The method of claim 1, wherein the hard material is diamond, the bonding layer is substantially formed by the [111] crystal structure of the diamond, and forming the bonding layer involves:
treating the bonding surface with a hydrogen plasma in the presence of oxygen and a carbon-containing gas at 600° C. to 1100° C. at a total pressure 30 torr or greater and a gas composition of 200 parts to 250 parts hydrogen, 0.5 parts to 3 parts oxygen, and 3 parts to 8 parts carbon-containing gas.

5. The method of claim 1, wherein the hard material is diamond, the bonding layer is substantially formed by the [100] crystal structure of the diamond, and forming the bonding layer involves:
treating the bonding surface with a hydrogen plasma in the presence of oxygen and a carbon-containing gas at 600° C. to 1100° C. at a total pressure less than 30 torr and a gas composition of 200 parts to 250 parts hydrogen, 0.5 parts to 3 parts oxygen, and 3 parts to 8 parts carbon-containing gas.

6. The method of claim 1, wherein the hard material is cubic boron nitride.

7. A drilling assembly comprising:
a drill string extendable from a drilling platform and into a wellbore;

a pump fluidly connected to the drill string and configured to circulate a drilling fluid into the drill string and through the wellbore; and a drill bit attached to an end of the drill string, the drill bit having a matrix bit body and a plurality of cutting cutters according to claim 6 coupled to an exterior portion of the matrix bit body.

8. The method of claim 1, wherein the hard material is silicon carbide.

9. A method of making a drill bit cutter, comprising:

depositing a refractory nitride layer on a bonding surface of a polycrystalline material body that comprises a hard material, the bonding surface opposing a contact surface of the polycrystalline material body;

forming, by chemical vapor deposition, a bonding layer on the refractory nitride layer, the bonding layer substantially formed by the chemical vapor deposition to have a [111] crystal structure of the hard material, a [100] crystal structure of the hard material, or a combination thereof; and brazing the bonding layer to a hard composite using a braze material to make the drill bit cutter.

10. The method of claim 9 further comprising:

forming the bonding layer to have a thickness of 10 microns to 250 microns at the bonding surface.

11. The method of claim 9 further comprising:

masking the refractory nitride layer before forming the bonding layer; and removing the mask after forming the bonding layer and before brazing the bonding layer to the hard composite.

12. The method of claim 9, wherein the hard material is diamond, the bonding layer is substantially formed by the [111] crystal structure of the diamond, and forming the bonding layer involves:

treating the refractory nitride layer with a hydrogen plasma in the presence of oxygen and a carbon-containing gas at 600° C. to 1100° C. at a total pressure 30 torr or greater and a gas composition of 200 parts to 250 parts hydrogen, 0.5 parts to 3 parts oxygen, and 3 parts to 8 parts carbon-containing gas.

13. The method of claim 9, wherein the hard material is diamond, the bonding layer is substantially formed by the [100] crystal structure of the diamond, and forming the bonding layer involves:

treating the refractory nitride layer with a hydrogen plasma in the presence of oxygen and a carbon-containing gas at 600° C. to 1100° C. at a total pressure less than 30 torr and a gas composition of 200 parts to 250 parts hydrogen, 0.5 parts to 3 parts oxygen, and 3 parts to 8 parts carbon-containing gas.

14. The method of claim 9, wherein the hard material is cubic boron nitride.

15. The method of claim 9, wherein the hard material is silicon carbide.

* * * * *